A. STEWART.
SAW FILER.
APPLICATION FILED MAR. 31, 1919.

1,314,912.

Patented Sept. 2, 1919.
2 SHEETS—SHEET 1.

Inventor:
A. Stewart,
by Hazard & Miller
Attys.

A. STEWART.
SAW FILER.
APPLICATION FILED MAR. 31, 1919.
1,314,912.
Patented Sept. 2, 1919.
2 SHEETS—SHEET 2.
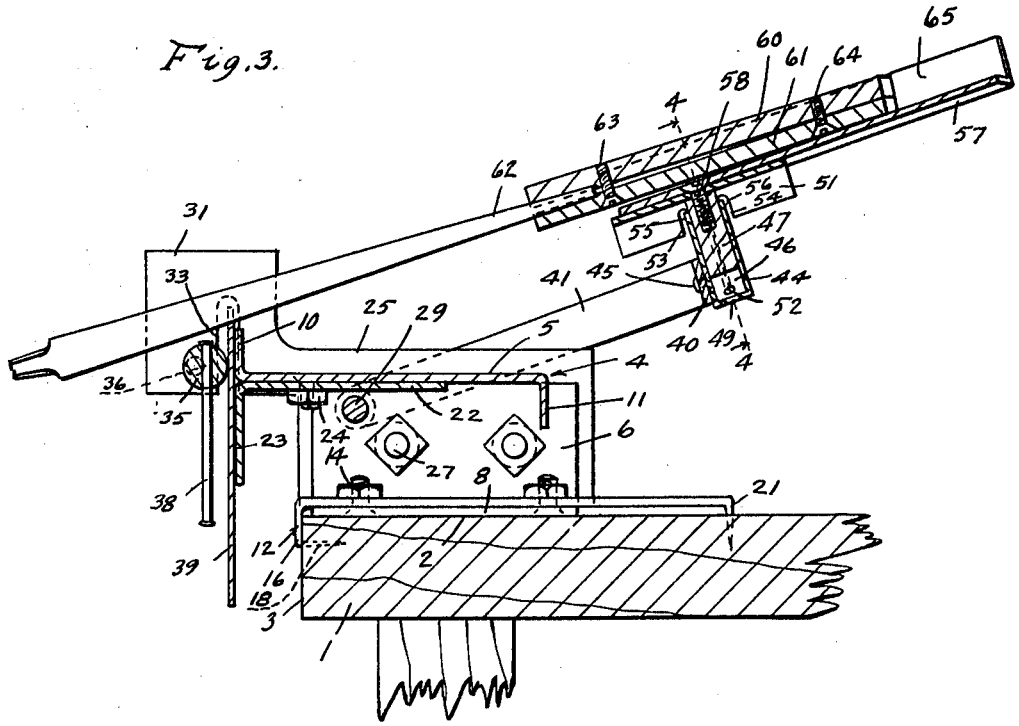
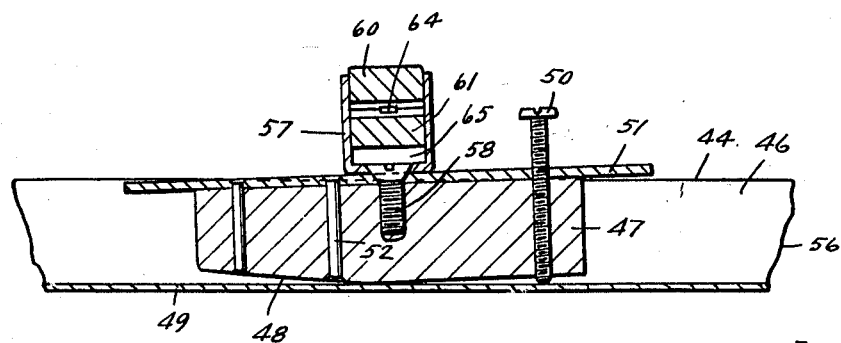
Inventor:
A. Stewart,
by Hazard & Miller
Attys.

UNITED STATES PATENT OFFICE.

ADAM STEWART, OF LOS ANGELES, CALIFORNIA.

SAW-FILER.

1,314,912. Specification of Letters Patent. Patented Sept. 2, 1919.

Application filed March 31, 1919. Serial No. 286,426.

*To all whom it may concern:*

Be it known that I, ADAM STEWART, a citizen of the United States, residing at Los Angeles, in the county of Los Angeles and State of California, have invented new and useful Improvements in Saw-Filers, of which the following is a specification.

My invention relates to saw filers and consists of the novel features herein shown, described and claimed.

Fig. 3 is a vertical cross section on the line 3—3 of Fig. 1 and on a plane parallel with Fig. 2.

Fig. 4 is a fragmentary sectional detail on the lines 4—4 of Figs. 1, 2 and 3.

Figure 1:
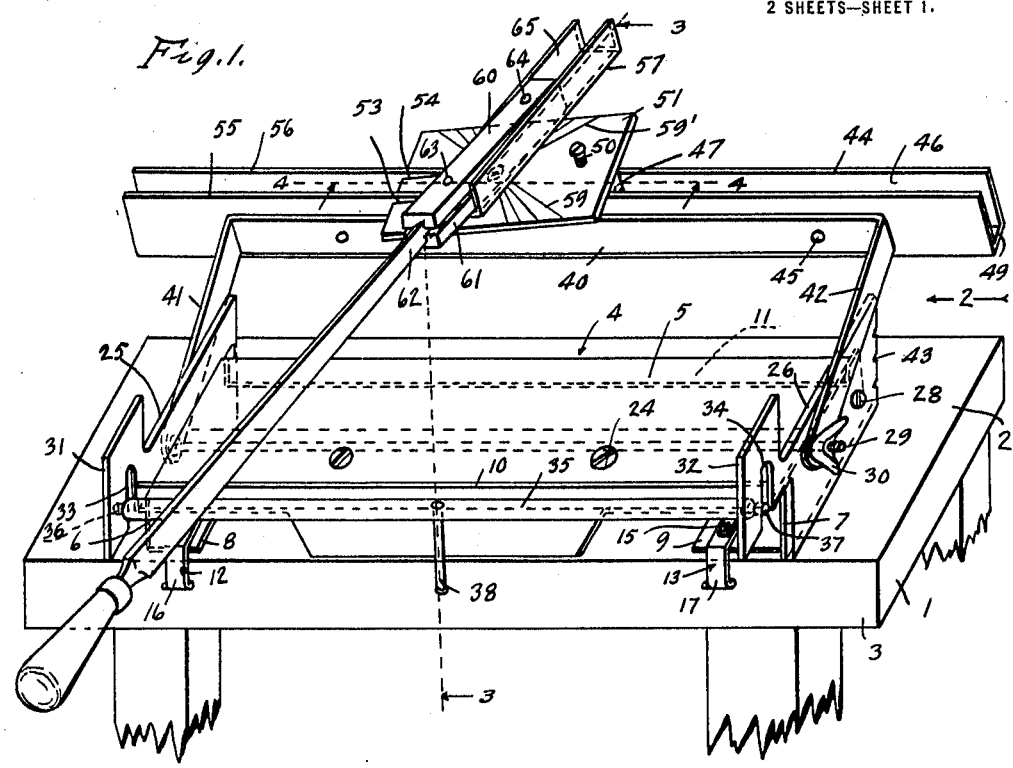
Figure 1 is a perspective of a saw filer embodying the principles of my invention.
Figure 2:
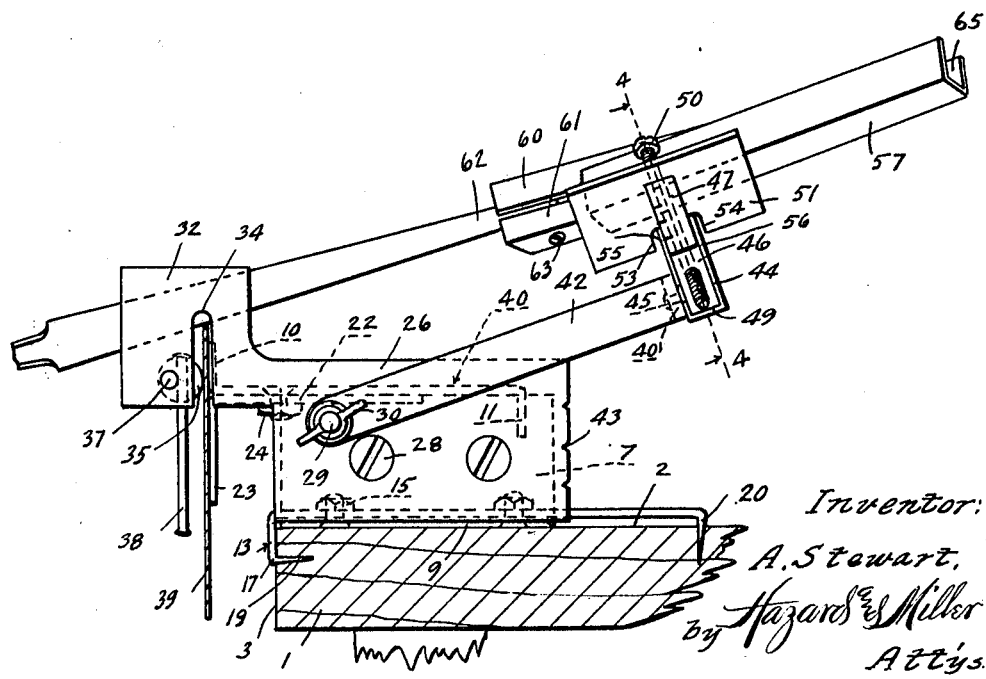
Fig. 2 is an end elevation as seen looking in the direction indicated by the arrow 2 in Fig. 1.

The work bench 1 may be any suitable construction having a flat top 2 and a straight vertical front edge 3. The spacing plate 4 has a flat central portion 5, supporting portions 6 and 7 extending downwardly from the ends of the central portion 5, attaching plates 8 and 9 extending forwardly from the lower edges of the portions 6 and 7 and resting upon the bench top 2, a stiffening flange 10 extending upwardly from the forward edge of the portion 5, and a stiffening flange 11 extending downwardly from the rear edge of the portion 5.

The attaching bars 12 and 13 are placed across the tops of the attaching plates 8 and 9 and secured in place by bolts 14 and 15. The forward ends of the bars 12 and 13 have portions 16 and 17 bent downwardly at right angles to fit against the front edge 3, and prongs 18 and 19 to drive into the bench 1, and the rear ends of the bars have prongs 20 and 21 to drive into the work bench 1. In applying the saw filer to a bench the plates 8 and 9 are placed upon the upper face 2 of the bench and moved backwardly and the prongs 18 and 19 driven into the front face 3 and then the prongs 20 and 21 driven downwardly.

A saw clamping plate 22 is placed upwardly against the portion 5 and has a downwardly extending flange 23 at its forward edge in line with the flange 10, and the plate 22 is secured to the portion 5 by screws 24. The bracket plates 25 and 26 fit against the supporting portions 6 and 7 and are secured in place by bolts 27 and 28. A clamping bolt 29 is inserted through the bracket plate 25, through the supporting portion 6, under the portion 5, through the portion 7, and through the bracket plate 26, and a wing nut 30 is placed upon the end of the clamping bolt outside of the plate 26. The saw clamping brackets 31 and 32 extend upwardly and forwardly from the bracket plates 25 and 26 and have notches 33 and 34 extending upwardly from their lower edges, said notches being in a plane just in front of the edges 10 and 23. A round clamping bar 35 has concentric pintles 36 and 37 extending through the brackets 31 and 32 so as to mount the clamping bar 35 parallel with the flanges 10 and 23. A pin is inserted through the center of the clamping bar 35 and extends downwardly to form a handle 38, so that when a saw blade 39 is inserted upwardly into the notches 33 and 34 against the front faces of the flanges 10 and 23 with the handle 38 pulled forwardly and upwardly and the handle depressed, the saw blade is firmly clamped with the saw teeth extending above the upper edge of the flange 10 and parallel therewith.

A back bar 40 is formed of stiff strap iron and the ends of the strap iron are bent at right angles to form the back bar supporting arms 41 and 42. The clamping bolt 29 is inserted through the forward end of the arm 41 before the bolt passes through the bracket plate 25, and the bolt is inserted through the forward end of the arm 42 after the bolt passes through the bracket 26 and before the nut 30 is applied. Radial graduations 43 are formed upon the outer faces of the bracket plates 25 and 26 to assist in adjusting the arms 41 and 42 to the desired level or angle, and to correspond with each other, that is to the same level or angle. The nut 30 is loosened and the back bar 40 raised or lowered to bring the arms 41 and 42 to the desired graduations and then the nut 30 tightened enough to hold the back bar in its adjusted position.

A channel guideway 44 is fixed against the back side of the back bar 40 by rivets 45 with the channel 46 opening upwardly. The guide block 47 fits in the channel 46 and has a rounded lower face 48 extending one way from the longitudinal center and fitting upon the straight upper face of the bottom 49 of the channel, and an adjusting screw 50 screw seated downwardly through the opposite end from the rounded lower face 48, so that by manipulating the screw 50 against the bottom 49 the block 47 may be tilted endwise in the channel 46. A plate 51 is mounted on top of the block 47 and secured in place by rivets 52, said plate having slots 53 and 54 through one end, so that when the block 47 is tilted the edges 55 and 56 of the channel guideway 44 will pass upwardly into the slots 53 and 54.

The file holder bearing 57 is a channel bar fitting upon the plate 51 and secured in place by a pivot screw 58 inserted downwardly through the bottom of the channel bar and tapped into the block 47 at the center of the plate 51. Graduations 59 are formed upon the upper face of the plate 51 for use in connection with the bearing 57 to properly locate the parts to get the proper angle for reciprocating the file, and when the parts are adjusted the pivot screw 58 is tightened to hold the bearing 57 rigidly upon the plate 51. The file clamp comprises an upper bar 60 and a lower bar 61 fitting in the bearing 57 and adapted to receive and grip the point of a saw file 62, said bars 60 and 61 being connected by screws 63 and 64, so that the screws may be loosened, the file inserted, and the screws tightened to rigidly grip the file and make a handle for the rear end of the file, said handle traveling in the channel 65 of the bearing 57.

It is usual in filing saws for the file 62 to travel at an upward incline, as shown in Fig. 3, and at a transverse incline, as shown in Fig. 1. The direction of the transverse incline is uniform for filing one side of the teeth, and then the direction of inclination is reversed for filing the other side of the teeth. For the purpose of reversing the direction of inclination the plate 51 carrying the block 47 may be lifted out of the channel 46 and turned half around, and for this purpose the graduations 59 serve for adjusting one angle, and the graduations 59' serve for adjusting the other angle.

Various changes may be made without departing from the spirit of my invention as claimed.

I claim:

1. A saw filer comprising a frame adapted to be rigidly mounted upon a bench, means for clamping a saw in the frame, a back bar, arms extending from the ends of the back bar and pivotally connected to the frame, means for adjusting and clamping the arms to the frame, a channel bar secured to the back bar, a block slidingly mounted in the channel bar, a bearing adjustably secured to the block, and a file clamp slidingly mounted in the bearing.

2. A saw filer comprising a frame, means for clamping a saw in the frame, a channel bar adjustably mounted relative to the frame, a block slidingly mounted in the channel bar, a bearing adjustably mounted upon the block, and a file clamp slidingly mounted in the bearing.

3. A saw filer comprising a frame, means for clamping a saw in the frame, a channel bar adjustably mounted relative to the frame, a block slidingly mounted in the channel bar, a bearing adjustably mounted upon the block, and a file clamp slidingly mounted in the bearing, there being a graduated plate fixed to the block for adjusting the bearing.

4. A saw filer comprising a frame, means for clamping a saw in the frame, a channel bar adjustably mounted relative to the frame, a block slidingly mounted in the channel bar, means for tilting the block endwise in the channel, a bearing adjustably mounted upon the block, and a file clamp slidingly mounted in the bearing.

5. A saw filer comprising a frame, means for clamping a saw in the frame, a channel bar adjustably mounted relative to the frame, a block slidingly mounted in the channel bar, means for tilting the block endwise in the channel, said block being reversible, a bearing adjustably mounted upon the block, and a file clamp slidingly mounted in the bearing.

In testimony whereof I have signed my name to this specification.

ADAM STEWART.

Copies of this patent may be obtained for five cents each, by addressing the "Commissioner of Patents, Washington, D. C."